Nov. 18, 1969　　　　　R. ANDRES　　　　　3,478,470
ACTUATING MECHANISM FOR A PIVOTAL WINDOW OF A MOTOR VEHICLE
Filed Feb. 16, 1968　　　　　　　　　　2 Sheets-Sheet 1

INVENTOR
RUDOLF ANDRES

BY *Craig & Antonelli*

ATTORNEYS

INVENTOR
RUDOLF ANDRES

BY *Craig & Antonelli*
ATTORNEYS

United States Patent Office  3,478,470
Patented Nov. 18, 1969

3,478,470
ACTUATING MECHANISM FOR A PIVOTAL
WINDOW OF A MOTOR VEHICLE
Rudolf Andres, Sindelfingen, Germany, assignor to
Daimler-Benz Aktiengesellschaft, Stuttgart-Unter-
turkheim, Germany
Filed Feb. 16, 1968, Ser. No. 706,078
Claims priority, application Germany, Feb. 18, 1967,
D 52,329
Int. Cl. E05f 11/34
U.S. Cl. 49—337                                25 Claims

ABSTRACT OF THE DISCLOSURE

An actuating mechanism for a pivotal window of a vehicle which is pivoted by a rotatable element actuated by a passenger from within the passenger space, whereby the rotatable element is connected to the pivotal window by way of a self-locking reduction gear that is so arranged and constructed that it produces an unequivocal angular coordination between the position of the rotatable element and the position of the pivotal window only within the range of the closing angle while outside of this closing angle, the pivotal window is connected with the rotatable element by way of a friction or detent clutch whose force can be manually overcome.

BACKGROUND OF THE INVENTION

The present invention relates to an actuating mechanism for a pivotal window of a motor vehicle which is adapted to be pivoted by means of a rotatable element actuatable from within the vehicle which is connected with the pivotal window by way of a self-locking connecting gear.

Pivotal windows of this type should be burglar-proof as well as safe against accidents and should be capable of rapid adjustment as well as of fine adjustment within the range of slight openings; additionally, they should be capable of being pressed with considerable pressure against the sealing frame consisting of rubber or the like and should also be adapted to be assembled without impairment of the door construction.

The frequently used pivotal-window locking mechanisms with the aid of window-hinge fasteners are, as known, neither safe against breaking-in nor safe against accidents because they project with metallic parts into the vehicle interior nor is it possible to adjust the same finely with the area of a slight opening because such an adjustment is not possible manually without reduction gears.

The known actuating mechanism with self-locking reduction gears which were used to quite a large extent up to some years ago and which could be pivoted by rotating a hand wheel, are safe against burglary as well as against accidents. They can be adjusted finely within the range of slight openings and are adapted to be pressed against the sealing frame with large forces. Since the entire reduction gear, which includes principally a worm and pinion, can be made of pressure-cast parts, it can be manufactured very inexpensively notwithstanding high quality. This type of actuating mechanism practically does not impair or weaken the door construction and can be readily installed. Notwithstanding these numerous advantages, this type of construction has been abandoned because worm gears have a great speed reduction and one has to rotate the hand wheel very long until the pivoting window is completely opened. This means for the driver that he has to pay attention to this activity for a relatively long period of time.

For purposes of rapid adjustability a lever-type locking mechanism has been proposed heretofore which operates according to the knee-lever or toggle-switch principle and which rapidly adjusts the pivotal window as well as enables a fine adjustment within the range of small openings but is neither safe against breaking-in nor safe against accidents and whose bell-crank or toggle-switch mechanism has to be well adjusted if the window is to be pressed strongly against the sealing frame. If this adjustment is inadequate, then whitsling noises occur which appear in particular with small gaps and against which one cannot do anything even by the actuation of the lever. Additionally, because of the accessibility to the bell-crank or toggle-type mechanism, the door has to be cut out in a manner weakening the same. The adjustment can be very time-consuming because the door covering has to be removed for that purpose and the high forces which occur, as known, with bell-crank or toggle-type transmissions, cause a relatively high wear that has to be absorbed by a renewed adjustment. Finally, this actuating mechanism is relatively expensive by reason of the lever extending into the passenger space which as stamping at first has to be deburred, then trued and finally chrome-plated or nickel-plated to a high polish.

SUMMARY OF THE INVENTION

It is the aim of the present invention to provide an actuating mechanism of the aforementioned type which, in combination, is safe against breaking-in as well as against accidents, can be changed rapidly and finely adjusted within the area of small openings, is adapted to be pressed strongly against the sealing frame as well as weakens only insignificantly the door construction and never requires careful adjustment.

The underlying problems are solved in accordance with the present invention in that the reduction gear produces only within the range of the closing angles an unequivocal coordination, from an angular rotational point of view, between the position of the rotating element and the position of the pivoting window, in that at least outside of this closing angle range, the pivoting window is connected with the rotating element by way of a slip or detent clutch and in that the force of the slip or detent clutch can be overcome manually.

According to a particularly advantageous construction of the present invention, provision is made that the actuating mechanism includes a worm non-rotatably connected with the rotating element, preferably with a hand wheel so as to rotate in unison therewith while the worm meshes with a first pinion whose extended axle stub is connected with the drive axle or drive shaft of the pivotal window, that a second pinion is provided coaxial to the first pinion and connected with the first pinion by way of a slip clutch, which second pinion also meshes with the worm, and in that the first pinion is provided with only a few teeth, preferably only with a single tooth. This construction represents a modification that cannot be recognized at all from the outside from the known actuating mechanisms which entail exclusively the great disadvantage that they could not be adjusted rapidly. As a result of the further development in accordance with the present invention, the construction known heretofore has been converted into an ideal actuating mechanism for pivotal windows.

It is favorable if the engaging surface of the first pinion with the worm is larger than the engaging surface of the second pinion. The largest forces in the connecting gear occur when the pivotal window is to be pressed against the sealing frame. This is taken into consideration by the larger engaging surface of the first pinion.

A simple slip clutch is obtained if both pinions are pressed against one another at their mutually opposite end faces by a spring.

If the first pinion is provided at its one end surface with a second shaft stub, on which the second pinion is rotatably supported, then one obtains both a compact construction as well as a favorable arrangement with respect to the worm as also with respect to a simple support for the second pinion.

The stress of the spring is not transmitted to the housing if a pressure or corpression spring is mounted on the second axle or shaft stub, which spring is supported both at the other end face of the second pinion as also against a projection of the second axle stub. These structural elements can then be inserted as a sub-assembly into the housing of the reduction gear.

The projection is realized in a simple manner by a pin, cotter or key extending through the second axle stub.

An additional locking effect of the spring results if the compression spring is supported both at the other end face of the second pinion as also against a housing part of the actuating mechanism and if a disk, reducing the friction, is disposed between the other end face of the first pinion and the housing area disposed opposite the same. The clamping ring or collar may then be dispensed with, by means of which one has braked heretofore the rotational movement of the extended axle stub in order to suppress the fluttering of the pivotal window during the drive of the motor vehicle. This clamping ring or collar is necessary because the play between the pinion and worm cannot be reduced to zero with reasonable expenditures.

A modified embodiment of the actuating mechanism using a detent means is obtained if the detent clutch is provided with a bore in one of the pinions, whereby a locking body, preferably a ball, is adapted to be urged by a spring partly out of this bore and into recesses provided in the oppositely disposed end face of the other pinion.

The recesses can be obtained without additional expenditures if the tooth gaps of the second pinion are the recesses.

Accordingly, it is an object of the present invention to provide an actuating mechanism for a pivotal window of a motor vehicle which avoids by simple means the shortcomings and drawbacks encountered in the prior art.

Another object of the present invention resides in an actuating mechanism for the pivotal windows of a motor vehicle which not only is safe against breaking in and against accidents and can be pressed with strong forces against the sealing frame without requisite impairment of the door construction, but additionally can also be adjusted rapidly while simultaneously permitting a fine adjustment of the window within the range of small window openings.

A further object of the present invention resides in an actuating mechanism of the aforementioned type which minimizes the attention the driver has to pay during actuation of said window.

A still further object of the present invention resides in an actuating mechanism for a pivoting window of motor vehicles which is relatively inexpensive in construction, can be readily assembled, particularly by the use of sub-assembled groups and obviates the need for careful adjustments and re-adjustments during use.

These and further objects, features, and advantages of the present invention will become more obvious from the following description when taken in connection with the accompanying drawing which shows, for purposes of illustration only, several embodiments in accordance with the present invention, and wherein.

Figure 1:
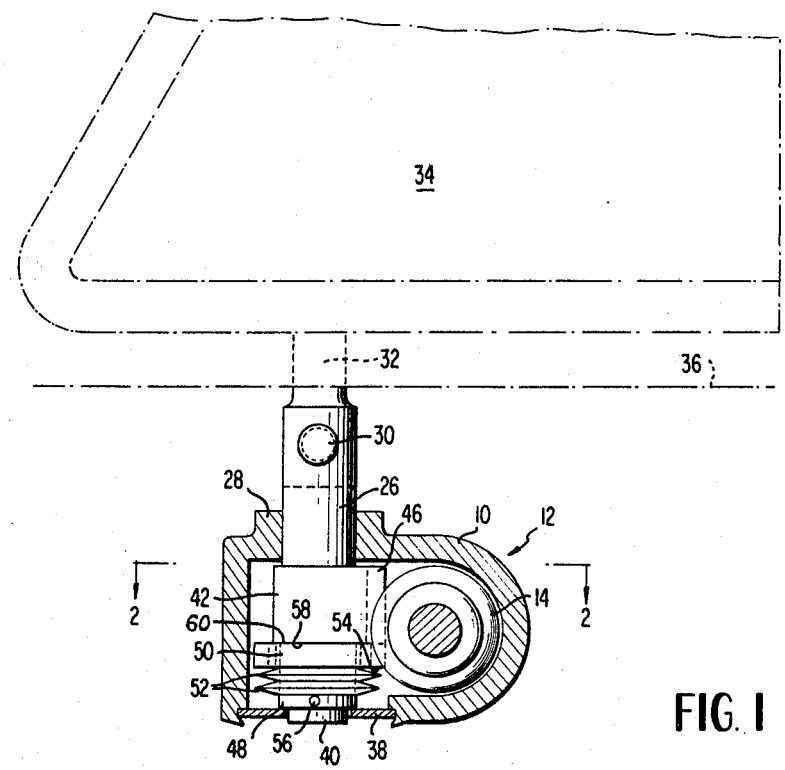
FIGURE 1 is a cross-sectional view through an actuating mechanism in accordance with the present invention with a pivotal window and door indicated in dash line, taken along line 1—1 of FIGURE 2.
Figure 2:
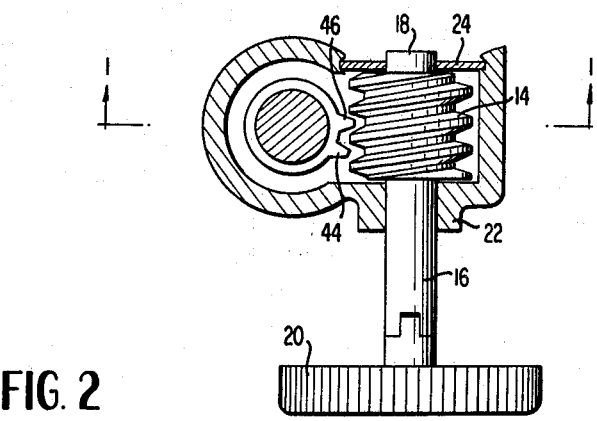
FIGURE 2 is a cross-sectional view taken along line 2—2 of FIGURE 1.

Referring now to the drawing wherein like reference numerals are used throughout the various views to designate like parts, and more particularly to FIGURES 1 and 2, a reduction gear generally designated by reference numeral 12 is accommodated within a housing 10 made, for example, of a pressure casting; the speed-reduction gear 12 includes a worm 14, which, together with its shaft portions or axle stubs 16 and 18, is also made of a pressure casting. The shaft portion 16 is connected in a conventional manner with a hand wheel 20 that can be actuated by a passenger of the vehicle. As shown, the shaft portion 16 is supported within a bearing eye 22 of the housing 10 whereas the shaft portion 18 is supported in a disk 24 that is snapped into the housing 10. An extended shaft portion or axle stub 26 is rotatably supported in a bearing eye 28 of the housing 10 and is connected by means of a bolt 30 with a drive shaft 32 of a pivotal window 34. The conventional window sealing frame consisting of rubber or the like is not shown for sake of clarity whereas the upper edge of the lower door rim 36 is indicated in dash line.

During the assembly, the reduction gear 12 is secured in a conventional manner by means (not shown) at the inner sheet metal panels of the vehicle door and later on the pivoting window 34 is so inserted that the drive shaft 32 can be connected with the axle stub 26 in that a bolt 30 is screwed in. Consequently, one necessitates exclusively a small cut-out in the inner sheet metal panel of the door which assures the access to the bolt 30. This cut-out can be quite small.

The parts so far described and also a cover 38 inserted into the housing 10 by snap fit which serves as closure and support for an extension 40 are known per se.

According to tthe embodiment illustrated in FIGURES 1 and 2, the first pinion 42, formed in one piece with the axle stub 26 and connected with the extension 40 is so constructed that of its teeth, only two teeth 44 and 46 remain. However, it is also completely adequate to provide only a single tooth.

Furthermore, the first pinion 42 is machined or turned down to a second axle stub 48 so that a second pinion 50 can be mounted over the axle stub 48 which second pinion is provided with teeth around its entire circumference and is in constant meshing engagement with the worm 14. As can be seen from FIGURE 1, the engaging surface of the second pinion 50 with the worm 14 is smaller than that of the first pinion 42. Additionally, two cup springs 52 are mounted on the axle stub 48 which are supported against the lower end face 54 and against a pin 56 that is, inserted through the axle stub 48. The slip clutch is formed by the lower end face 58 of the first pinion 42 and the upper end face 60 of the second pinion 50. This surface is relatively large and therefore resistant to wear. During the operation of the actuating mechanism described, it is assumed that the closed pivotal window 34 is to be opened. For that purpose, one rotates the hand wheel 20 in such a manner that the worm 14 moves in the clockwise direction as viewed in FIGURE 1. As a result thereof, the teeth 44, 46 of the first pinion 42 move in the counterclockwise direction. A fine adjustment of the pivotal window 34 is thereby possible as usual. The self-locking feature has been retained and, by reason of the large hand wheel 20, the actuating mechanism is also safe against accidents. If one continues to rotate the hand wheel 20, then the teeth 44 and 46 come out of engagement with the worm 14. From that moment on, the pivotal window 34 can now be rotated in that one seizes the same directly because the slip clutch permits a movement of the first pinion 42 with respect to the second pinion 50. Additionally, a fine adjustment by rotation at the hand wheel 20 is still possible in every position because the slip clutch connects the first pinion 42 and the second pinion 50 and the second pinion 50 is constantly in meshing engagement with the worm 14.

If the pivotal window 34 is to be closed again, then by direct pivoting of the pivotal window 34 one can bring the first pinion 42 into a position in which its tooth 44 can enter into engagement with a spiral of the worm 14. The same situation can also be achieved, however, in that one rotates, albeit correspondingly longer, the hand wheel 20 in the counterclockwise direction as viewed in FIGURE 1. As a result of the further rotation of the hand wheel 20, the teeth 44 and 46 are drawn in into the worm 14 and one is able by a forceful rotation at the hand wheel 20 to press the pivotal window 34 with its edge area against the sealing frame.

Figure 3:
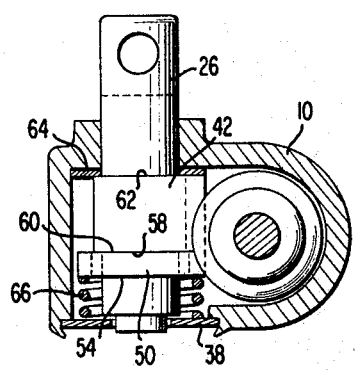
FIGURE 3 is a cross-sectional view, similar to FIGURE 1, through a second modified embodiment of an actuating mechanism in accordance with the present invention.

In the embodiment according to FIGURE 3, a disk 64 is inserted between the inner side of the housing 10 and the upper end face 62 of the first pinion 42 which disk assures that the friction within this area is smaller than the friction between the end face 58 of the first pinion 42 and the end face 60 of the second pinion 50.

Additionally, a compression or coil spring 66 has been inserted in this embodiment between the lower end face 54 of the second pinion 50 and the cover 38. The axle stub 26 is prevented by this construction against unintentional rotary movements with respect to the housing 10, for example, as a result of the dynamic air pressure.

Figure 4:
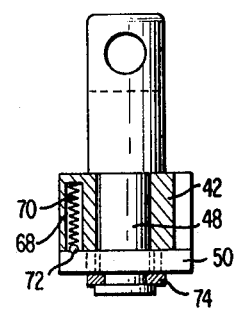
FIGURE 4 is a simplified cross-sectional view, similar to FIGURES 1 and 3, through a third embodiment of an actuating mechanism in accordance with the present invention in which the housing and worm are omitted for sake of clarity.

In the embodiment according to FIGURE 4, a detent clutch is shown in which a dead-end bore 68 is accommodated in the first pinion 42, shown in cross section, from the end face 58 thereof. A compression spring 70 is inserted into this dead-end bore 68 which presses a ball 72 out of the dead-end bore 68 against the second pinion 50. A detent effect is thus obtained in conjunction with the teeth of the second pinion 50. In order that the compression spring 70 is not able to push away the second pinion 50, a snap ring 74 is provided which is snapped over the axle stub 48.

Figure 5:
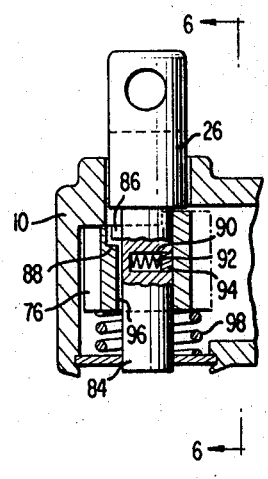
FIGURE 5 is a simplified cross section similar to FIGURE 1, through a fourth embodiment of an actuating mechanism in accordance with the present invention.
Figure 6:
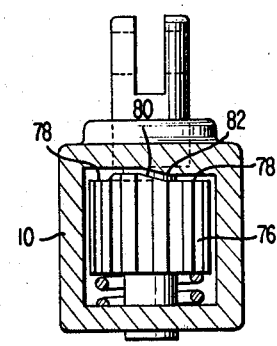
FIGURE 6 is a cross-sectional view taken along line 6—6 of FIGURE 5.

In the last embodiment of FIGURES 5 and 6, only one pinion 76 is provided corresponding to the second pinion 50, which in turn is provided at its upper end face 78 with a curved or cam surface 80 that cooperates with a curved or cam surface 82 illustrated at an exaggerated large distance; the cam surface 82 is formed in one piece with the housing 10. A bearing shaft 84 includes a nose portion 86 that extends into an aperture 88 of the pinion 76 open at the edge thereof.

The slip clutch includes in this embodiment a bore 90 within the bearing shaft 84 into which a compression spring 92 is inserted that presses a friction body 94 against the bearing surface 96 of the pinion 76. During the operation of this actuating mechanism at first the pinion 76 is rotated in the usual manner until the cam surface 80 abuts against the cam surface 82. Up to that point, a rigid entrainment of the axle stub 26 took place by reason of the form-locking connection of nose portion 86 and aperture 88. With a further rotation, the pinion 76 is displaced downwardly against the force of a compression spring 98 so that the form-locking connection between nose portion 86 and aperture 88 is released, and the axle stub 26 becomes freely rotatable.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An actuating mechanism for a pivotal window of a vehicle which is adapted to be pivoted, both within and outside a range of closing angle defining the area of slight opening of the pivotal window, by a rotatable element actuatable by a passenger and in which the rotatable element is operatively connected with the pivotal window by way of a self-locking reduction gear means, wherein the improvement essentially comprises first means in said reduction gear means for providing a driving connection with proportional movement between the rotatable element and the pivotal window, only within the range of the closing angle, and second means operatively connecting the pivotal window with the rotatable element for enabling relative movement of the pivotal window with respect to the rotatable element outside of this range of closing angle by the application of manual force.

2. An actuating mechanism according to claim 1, wherein the second means includes friction clutch means.

3. An actuating mechanism for a pivotal window associated with a sealing frame of a vehicle which is adapted to be pivoted, both within and outside a range of closing angle defining the area of slight opening of the pivotal window, by a rotatable element actuatable by a passenger or directly by hand pressure of the passenger and in which the rotatable element is operatively connected with the pivotal window by self-locking reduction gear means, wherein the improvement essentially comprises first means in said reduction gear means for providing a positive driving connection between the rotatable element and the pivotal window, only within the range of the closing angle, which positive driving connection cannot be overcome by hand pressure and which exerts considerable pressure in pressing the pivotal window against the sealing frame, and second means operatively connecting the pivotal window with the rotatable element outside of the range of the closing angle for enabling the connection to be overcome by hand pressure.

4. An actuating mechanism according to claim 3, wherein the second means includes force-locking clutch means.

5. An actuating mechanism according to claim 1, wherein said second means includes clutch means whose force can be overcome by hand.

6. An actuating mechanism according to claim 5, wherein said clutch means is a slip clutch means.

7. An actuating mechanism according to claim 5, wherein said clutch means is a detent clutch means.

8. An actuating mechanism according to claim 5, wherein said reduction gear means includes a worm operatively connected with a hand wheel forming the rotatable element, said worm meshing with a first pinion whose axle stub is operatively connected with the pivotal window by way of the latter's drive shaft, a second pinion arranged substantially coaxially to the first pinion and operatively connected with the first pinion by way of a clutch means, said second pinion also meshing with said worm, and said first pinion being provided with only a few teeth.

9. An installation according to claim 8, wherein said first pinion only has a single tooth.

10. An installation according to claim 8, wherein the engaging surface of the first pinion with the worm is larger than the engaging surface of the second pinion.

11. An actuating mechanism according to claim 10, further comprising spring means for pressing the two pinions against each other at the mutually opposite end faces thereof.

12. An actuating mechanism according to claim 11, wherein the first pinion is provided with a second stub axle at one of its end faces on which the second pinion is rotatably supported.

13. An actuating mechanism according to claim 8, further comprising spring means for pressing the two pinions against each other at the mutually opposite end faces thereof.

14. An actuating mechanism according to claim 8, wherein the first pinion is provided with a second stub axle at one of its end faces on which the second pinion is rotatably supported.

15. An actuating mechanism according to claim 14, further comprising a compression spring means mounted over said second stub axle, said compression spring means being supported both against the other end face of the second pinion and also against a projection of the second axle stub.

16. An actuating mechanism according to claim 15, wherein the projection is a pin extending through the second axle stub.

17. An actuating mechanism according to claim 14, further comprising compression spring means supported both at the other end face of the second pinion as well as at a housing part of the actuating mechanism, and disk means reducing the friction disposed between the other end face of the first pinion and the oppositely disposed housing area.

18. An actuating mechanism according to claim 8, wherein said clutch means is a slip clutch means.

19. An actuating mechanism according to claim 8, wherein said clutch means is a detent clutch means.

20. An actuating mechanism according to claim 19, wherein the detent clutch means is provided with a bore in one of the pinions out of which a locking body is adapted to be partly displaced by a spring means into recesses provided at the opposite end face of the other pinion.

21. An actuating mechanism according to claim 20, wherein the recesses are formed by the tooth gaps of the second pinion.

22. An actuating mechanism according to claim 1, wherein said pivotal window includes a drive shaft operatively connected with a bearing shaft, a displaceable pinion supported on said bearing shaft, said displaceable pinion being axially movable against the force of a spring means, said displaceable pinion being operatively connected with the bearing shaft by way of a clutch means, form-locking connecting means between the displaceable pinion and the bearing shaft, and cam surface means for rendering ineffectual the form-locking connection, said cam surface means being operable to effect axial displacement of said displaceable pinion upon rotation and simultaneous entrainment to suspend thereby the form-locking connection.

23. An actuating mechanism according to claim 22, wherein the clutch means is a slip clutch provided with a bore in the bearing shaft, spring means pressing a friction body out of said bore against the bearing surface of the displaceable pinion.

24. An actuating mechanism according to claim 23, wherein the form-locking connecting means includes a nose portion securely connected with the bearing shaft which is adapted to be inserted into an aperture, open at the edge and provided in the bearing surface of the displaceable pinion.

25. An actuating mechanism according to claim 22, wherein the form-locking connecting means includes a nose portion securely connected with the bearing shaft which is adapted to be inserted into an aperture, open at the edge and provided in the bearing surface of the displaceable pinion.

References Cited
UNITED STATES PATENTS

| | | | |
|---|---|---|---|
| 2,073,173 | 3/1937 | Potter | 49—337 |
| 2,138,539 | 11/1938 | Flynn | 49—337 X |
| 2,812,207 | 11/1957 | Townsend | 49—337 |
| 3,199,363 | 8/1965 | Pickles | 74—425 |

J. KARL BELL, Primary Examiner

U.S. Cl. X.R.

49—276; 74—89.14, 416